United States Patent
Onishi et al.

(10) Patent No.: US 6,819,216 B2
(45) Date of Patent: Nov. 16, 2004

(54) THERMOSTAT

(75) Inventors: Ichiro Onishi, Shiga (JP); Yoshihide Nakajima, Shiga (JP); Naotake Kokubu, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 78 days.

(21) Appl. No.: 10/414,752

(22) Filed: Apr. 16, 2003

(65) Prior Publication Data

US 2003/0226903 A1 Dec. 11, 2003

(30) Foreign Application Priority Data

Apr. 19, 2002 (JP) ........................................ 2002-117273

(51) Int. Cl.[7] .......................... H01H 37/54; H01H 37/12
(52) U.S. Cl. ...................... 337/327; 337/320; 337/312; 337/306
(58) Field of Search .......................... 337/32, 298, 306, 337/309, 311, 312, 327, 330, 332, 382, 383, 390–396, 398, 114–119, 333, 343, 362–368, 318–323; 200/406, 407, 448, 460, 461; 29/622

(56) References Cited

U.S. PATENT DOCUMENTS

| | | | | |
|---|---|---|---|---|
| 2,194,533 A | * | 3/1940 | Dyke | .................... 200/83 P |
| 3,185,796 A | * | 5/1965 | Mamiya et al. | ............. 337/317 |
| 3,412,357 A | * | 11/1968 | Odashima | .................... 337/300 |
| 3,636,287 A | * | 1/1972 | Jorgensen et al. | ......... 200/83 P |
| 4,388,605 A | * | 6/1983 | Machida et al. | ............ 337/301 |
| 4,510,480 A | * | 4/1985 | Rossi et al. | .................. 337/321 |
| 4,540,860 A | * | 9/1985 | Odashima et al. | ........ 200/83 C |
| 4,794,363 A | * | 12/1988 | Hirata et al. | ................. 337/314 |
| 6,252,492 B1 | * | 6/2001 | Frank et al. | ................. 337/365 |
| 6,307,461 B1 | * | 10/2001 | Frank et al. | ................. 337/305 |
| 6,525,641 B1 | * | 2/2003 | Frank | .......................... 337/365 |

FOREIGN PATENT DOCUMENTS

| JP | 56-2546 | | 1/1981 | |
|---|---|---|---|---|
| JP | 02195622 A | * | 8/1990 | .......... H01H/37/38 |

* cited by examiner

Primary Examiner—Anatoly Vortman
(74) Attorney, Agent, or Firm—RatnerPrestia

(57) ABSTRACT

A thermostat includes a wall plate unitarily molded of thermoplastic resin, a first metal plate holding a temperature sensing section, and a second metal plate holding a cam shaft. A fulcrum of a lever and a fulcrum of adjusting plate are protected by the wall plate and they are not exposed to the outside. Since both the fulcrums are not exposed to the outside, the fulcrums are free from being touched with foreign matters. This thermostat thus prevents a temperature set therein from changing.

6 Claims, 6 Drawing Sheets

THERMOSTAT

FIELD OF THE INVENTION

The present invention relates to thermostats for controlling a temperature in a storage room of refrigerators.

BACKGROUND OF THE INVENTION

Thermostats are widely used to control a temperature in a storage room of refrigerators. Such a thermostat is disclosed in Japanese Utility Model Publication No. S56-2546. A conventional thermostat is described hereinafter with reference to FIGS. 6 and 7. FIG. 6 shows a front view of the conventional thermostat, and FIG. 7 shows a lateral view of the same thermostat. In FIGS. 6 and 7, housing 101 is made from metal plate undergone press working that forms the metal plate into one-piece housing. Housing 101 is formed of upper face 102, two long side-faces 103 and one short side-face 104.

Switch section 105 is placed such that it faces short side-face 104 of housing 101. Bottom plate 106 faces upper face 102. On upper face 102, adjusting shaft 107, cam 107a formed at the root of shaft 107, and adjusting plate 108 displaced by cam 107a are provided.

Switch section 105 has a switch mechanism (not shown) inside housing 101, and coupling terminals 105a, 105b protruding outward from housing 101. Beneath bottom plate 106 bellows 109 is prepared, and it communicates with the inside of housing 101, so that displacement of bellows 109 activates the switch mechanism of switch section 105. Bellows 109 is filled with gas that is expanded or compressed in response to an atmospheric temperature.

Tube 110 extends from bellows 109 by a given length and communicates with the inside of bellows 109, so that tube 110 is also filled with the gas.

The gas in tube 110 is expanded or compressed in response to the atmospheric temperature. An expansion prolongs bellows 109, thereby operating the switch mechanism to close a circuit. A compression, on the contrary, shortens bellow 109, thereby releasing the switch mechanism from the operation and opens the circuit.

Rotating shaft 107 by a given angle causes cam 107a to rotate by a given angle, so that adjusting plate 108 rotates along cam 107a to produce displacement. This displacement of adjusting plate 108 strengthens or weakens force of operating the switch mechanism. A balance between this operating force and working force of bellows 109 at expansion or compression can set a temperature at which the circuit opens or closes. Long side-face 103 has supporting hole 103a for supporting fulcrum 108a on which adjusting plate 108 rotates, and fulcrum 108a exposes itself outward.

Adjusting screw 111 is prepared for fine adjustment of the temperature set by the rotational position of adjusting shaft 107. A user can rotate screw 111 with a driver via through-hole 104a punched on short side-face 104.

However, since the foregoing conventional thermostat has fulcrum 108a, related to adjusting plate 108, exposed from supporting hole 103a, a user is liable to touch fulcrum 108a with a finger when the user holds housing 101 in the hand, so that the set temperature tends to change.

Further, the foregoing conventional thermostat has adjusting screw 111 at an upper section of housing 101, and switch section 105 is placed at a lower section of housing 101, so that coupling terminals 105a, 105b protrude downward, which makes housing 101 unstable. In order to make housing stable, long side-face 103 or short side-face 104 should face downward, then a user looks at adjusting screw 111 laterally, which makes an adjustment difficult.

SUMMARY OF THE INVENTION

The present invention addresses the problems discussed above and aims to provide a thermostat that comprises the following element:
- a housing;
- a switch mechanism having contacts and accommodated in an outer shell;
- a temperature sensing section which converts a volume change of gas being expanded or compressed in response to an atmospheric temperature into force for operating the switch mechanism;
- a lever for opening or closing the contact by rotating itself on a first fulcrum with the force supplied from the temperature sensing section;
- an adjusting plate engaged with the lever and rotating itself on a second fulcrum for increasing or decreasing the force necessary for rotating the lever; and
- a cam shaft having a cam that rotates the adjusting plate.

The housing is placed outside a supporting wall that supports the first and the second fulcrums, and includes a wall that covers both the fulcrums.

DETAILED DESCRIPTION OF THE EXEMPLARY EMBODIMENT

The present invention solves the problems inherent in conventional thermostats, and aims to provide a thermostat of which adjusting plate and fulcrums of moving sections are free from being touched with fingers or other foreign matters.

The present invention also aims to make the thermostat stable when a set temperature is adjusted, and make the adjustment simple.

Figure 1:
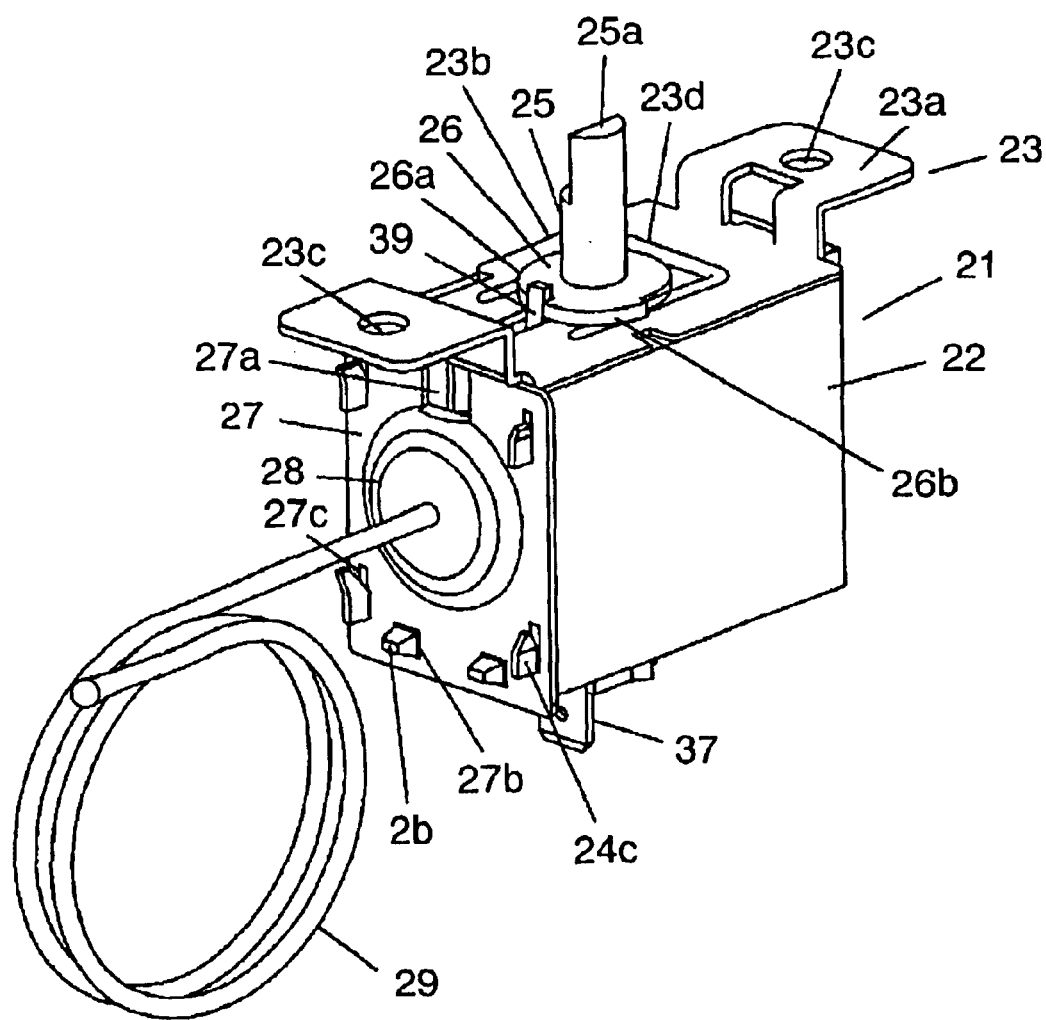
FIG. 1 shows a perspective view illustrating a thermostat in accordance with an exemplary embodiment of the present invention.
Figure 2:
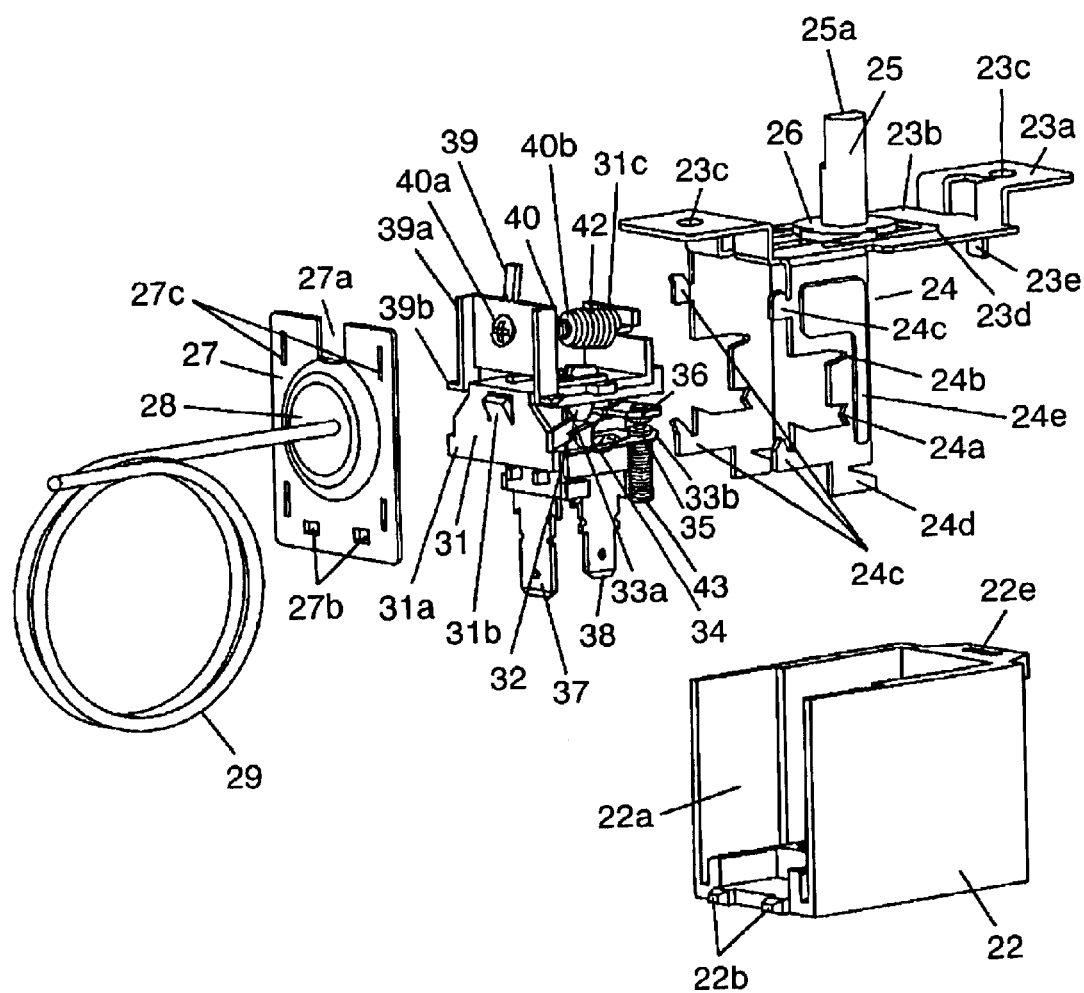
FIG. 2 shows an exploded perspective view illustrating the same thermostat shown in FIG. 1.
Figure 3:
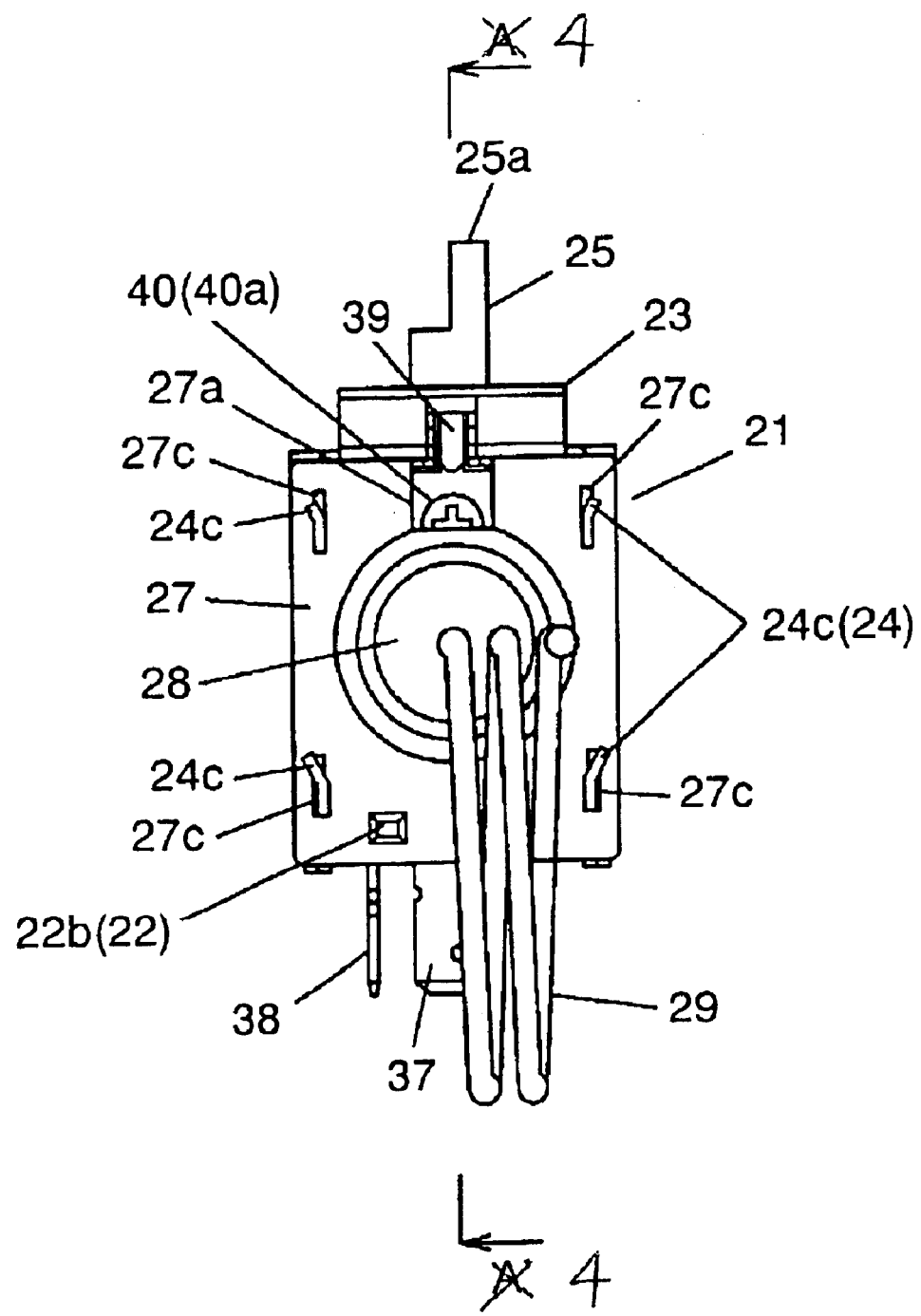
FIG. 3 shows a left lateral view of the thermostat shown in FIG. 1.
Figure 4:
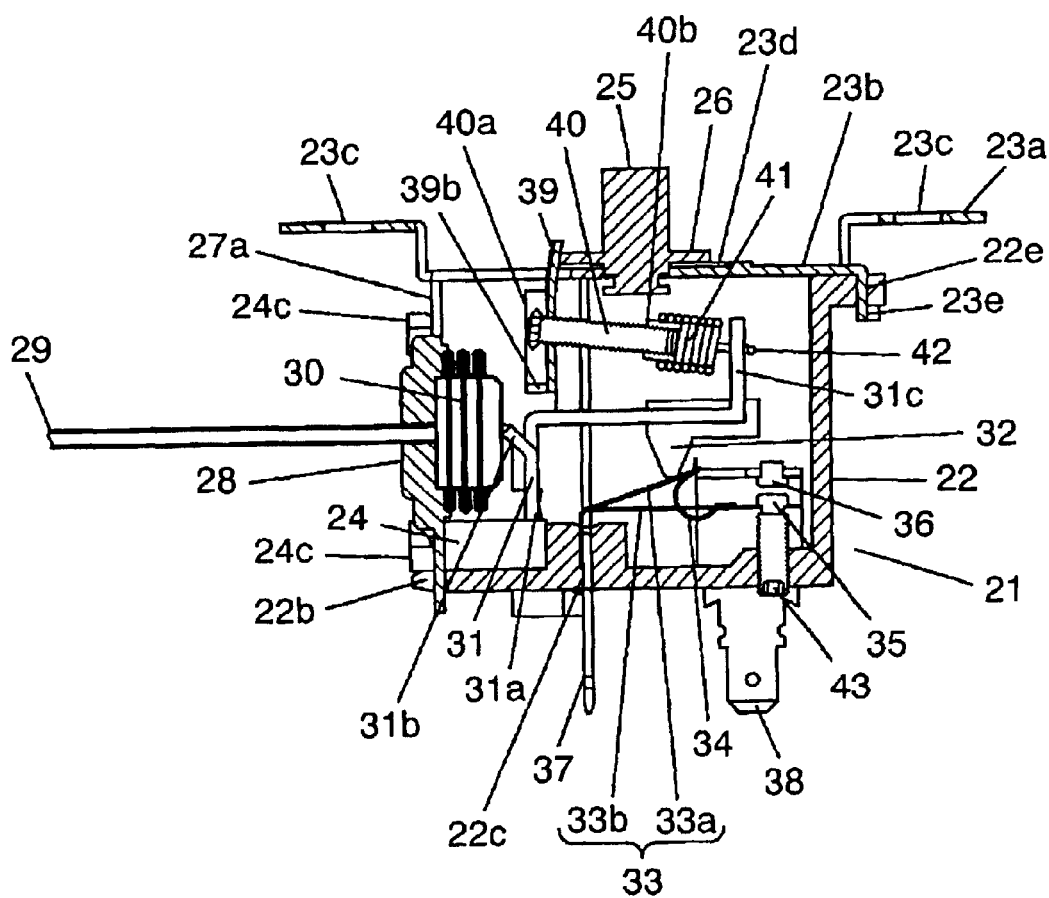
FIG. 4 shows a sectional view taken along line 4—4 in FIG. 3.

An exemplary embodiment of the present invention is demonstrated hereinafter with reference to FIG. 1–FIG. 4. FIG. 1 shows a perspective view of a thermostat in accordance with this exemplary embodiment of the present invention. FIG. 2 shows an exploded perspective view of the thermostat shown in FIG. 1. FIG. 3 shows a left lateral view of the thermostat shown in FIG. 1. FIG. 4 is a sectional view taken along line A–A' in FIG. 3.

In FIG. 1–FIG. 4, housing 21 forms an outer shell. Wall plate 22 includes four walls out of six walls that constitute housing 21, which is unitarily molded of thermoplastic resin. Wall plate 22 includes protective face 22a, positioning projections 22b, holding hole 22c, linkage hole 22d (shown in FIG. 5), and another linkage hole 22e. Protective face 22a covers supporting wall 24, and positioning projections 22b are inserted into positioning holes 27b punched on first metal plate 27. Holding hole 22c holds conductive plate 37 and terminal plate 38. Linkage hole 22d receives linkage claw 24d prepared on supporting wall 24. Another linkage hole 22e receives linkage claw 23e prepared on second metal plate 23.

Second metal wall 23 is one of the walls of housing 21 and formed of mounting face 23a to be mounted to the outside and holding face 23b for covering an opening of wall plate 22 as well as holding cam-shaft 25. Mounting face 23a includes mounting holes 23c for receiving a mounting screw. Holding face 23b includes projection 23d and linkage claw 23e. Cam 26 slides along projection 23d. Linkage claw 23e is inserted into linkage hole 22e and deformed at parts, thereby linking wall plate 22 to second metal plate 23.

Supporting wall 24 extends from holding face 23b along protective face 22a, and includes fulcrum receptors 24a, 24b and linkage claws 24c, 24d, and protruding face 24e. Receptor 24a supports first fulcrum 31a that is the fulcrum of lever 31, and receptor 24b supports second fulcrum 39b that is the fulcrum of adjusting plate 39. Linkage claw 24c is inserted into linkage hole 27c punched on first metal plate 27, thereby linking supporting wall 24 to first metal plate 27. Linkage claw 24d is inserted into linkage hole 22d, thereby linking wall plate 22 to supporting wall 24. Protruding face 24e rises outward by 0.3 mm–0.5 mm from other areas.

Fulcrum receptors 24a, 24b are placed at the area other than protruding face 24e of supporting wall 24, and they do not rise higher than protruding face 24e. Linkage claws 24c, 24d are inserted into corresponding holes respectively and they are deformed at parts, so that the linkage is achieved.

Cam shaft 25 protrudes outward from a substantial center of second metal plate 23, and has cam 26 at the place where projection 23d touches. End section 25a of cam shaft 25 is shaped like a half cylinder by a given length, so that this shape works as a stopper to prevent, e.g., a dial mounted on shaft 25, from rotating.

Cam 26 is formed of cam face 26a and stopper 26b. Cam face 26a is formed such that face 26a gradually expands and goes away from the shaft center as it goes counterclockwise viewed from shaft 25. Stopper 26b protrudes outward with acute-angles in a direction away from the shaft center, and it partitions both the end of cam face 26a.

First metal plate 27 covers the remaining opening of housing 21 and includes observation hole 27a, positioning hole 27b and linkage hole 27c. Adjusting screw 40 can be seen from the outside through observation hole 27a.

Temperature sensing section 28 is formed on first metal plate 27, and has detecting tube 29 at its center. Detecting tube 29 extends to a place at which temperature is to be detected. Flexible bellows 30 is disposed inside housing 21.

Detecting tube 29 communicates with bellows 30 at their insides and the gas for detecting a temperature is filled therein. A volume of the gas is expanded or compressed in response to a temperature detected, so that bellows 30 also expands or shrinks in response to a change of the gas.

Lever 31 converts the expansion and shrinkage of bellows 30 into rotary movement. Lever 31 is formed of first fulcrum 31a supported by fulcrum receptor 24a of supporting plate 24, power point 31b receiving force by contacting with bellows 30, and action point 31c that is displaced in the greatest distance.

Urging member 32 is placed between power point 31b and action point 31c, so that it works on receptive spring 33a of switch spring 33, which is formed of two springs, i.e., receptive spring 33a and movable spring 33b. Receptive spring 33a keeps bowing due to urging at any time by urging member 32. Movable spring 33b jumps momentarily thereby bringing contact 35 into contact with fixed contact 36 when receptive spring 33a exceeds a given position due to the urging.

Toggle spring 34 is shaped like letter U, and a first end thereof is supported by receptive spring 33a and a second end is supported by movable spring 33b. When receptive spring 33a is displaced due to the urging by member 32, toggle spring 34 stores energizing force in itself. When receptive spring 33a overruns the given position, the stored energizing force is released to movable spring 33b, so that movable spring 33b momentarily jumps thereby bringing contact 35 into contact with fixed contact 36.

Contact 35 is fixed at a free end of movable spring 33b, and contact 36 is positioned at a place where contact 35 arrives when movable spring 33b jumps, and yet, where contact 36 is brought into contact with contact 35 face to face.

Conductive plate 37 is linked to switch spring 33 and protrudes outward through holding hole 22c punched on wall plate 22. Terminal plate 38 is linked to fixed contact 36 and protrudes outward through holding hole 22c punched on wall plate 22. Conductive plate 37 and terminal plate 38 become conductive with each other when contact 35 is brought into contact with fixed contact 36.

The switch mechanism of the thermostat of the present invention comprises switch spring 33, toggle spring 34, contact 35 and fixed contact 36.

Adjusting plate 39 is supported by supporting wall 24 at its first end, and a second end of plate 39 is brought into contact with cam face 26a. Adjusting plate 39 rotates on second fulcrum 39b in response to a change of a height of cum face 26a. Adjusting screw 40 extends through the center of adjusting plate 39, which thus supports screw 40. Screw head 40a is rotatably supported on plate 39, and the end of screw 40 engages with linking member 40b.

Coil spring 41 is fixed to linking member 40b at its first end such that the first end winds itself around linking member 40b. Linking member 40b is inserted into coil spring 41 such that the outer wall of linking member 40b bites into the inner rim of coil spring 41, so that they fit tightly with each other. A second end of coil spring 41 has U-shaped hook 42, which is caught on action point 31c of lever 31.

Screw 43 screws into wall plate 22 to urge contact 35 from the behind, thereby adjusting a position of contact 35. Rotating of screw 43 changes the position of contact 35 for adjusting only a set temperature (ON temperature) that turns on contact 35. For instance, advancing of screw 43 pushes up contact 35 toward fixed contact 36. This action can reduce a displacement necessary for receptive spring 33a to jump movable spring 33b toward fixed contact 36, and also reduce rotational amount necessary for lever 31 as well as an extension amount required to bellows 30. As a result, volume expansion required to the gas filled in detecting tube 29 and bellows 30 can be also reduced, which allows an atmospheric temperature lower than the set temperature to turn on the contact.

On the contrary, stepping back of screw 43 to move contact 35 away from fixed contact 36 increases the displacement required to receptive spring 33a to jump movable spring 33b toward fixed contact 36. Thus the more rotational amount is required to lever 31, and more extension is required to bellows 30. As a result, more volume expansion is required to the gas filled in detecting tube 29 and bellows 30. This condition permits the contact to turn on only at an atmospheric temperature not lower than the set temperature.

An operation of the thermostat discussed above is demonstrated hereinafter. Cooling operation starts at the ON temperature in a refrigerator. Detecting tube 29 is prepared at a given place in a storage room of the refrigerator. When an ambient temperature of detecting tube 29 rises to a temperature not lower than the ON temperature, the gas filled in tube 29 expands, so that an inner pressure of tube 29 and bellows 30, communicating with tube 29 at their inside, rises.

Bellows 30 extends longitudinally due to the rise of its inner pressure, thereby pressing power point 31b of lever 31. Then lever 31 is going to rotate on first fulcrum 31a. However, at this time, hook 42 is caught on action point 31c of lever 31, thus lever 31 is prevented from rotating.

Bellows 30 further extends, and action point 31c pulls coil spring 41 with greater force than preventing force of hook 42, thereby extending coil spring 41. Then lever 31 starts rotating, and urging member 32 pushes receptive spring 33a of switch spring 33.

Urging member 32 keeps urging receptive spring 33a, so that toggle spring 34 is deformed and stores energizing force therein. When receptive spring 33a is over urged and exceeds a given position, toggle spring 34 releases its energizing force at once, and movable spring 33b that supports toggle spring 34 jumps momentarily, so that contact 35 is brought into contact with fixed contact 36.

As a result, conductive plate 37 and terminal plate 38 are electrically coupled to each other, thereby starting the cooling operation of the refrigerator. Conductive plate 37 and terminal plate 38 correspond to two terminals of the switch mechanism in the thermostat of the present invention.

On the contrary, when the ambient temperature of detecting tube 29 disposed in the refrigerator lowers, the gas in tube 29 is compressed, and an inner pressure of bellows 30 also lowers, so that bellows 30 shrinks away from power point 31b. Since action point 31c is pulled by coil spring 41, lever 31 rotates to follow bellows 30.

Urging member 32 thus displaces away from receptive spring 33a, which also displaces following receptive spring 33a. When the ambient temperature of detecting tube 29 disposed in the refrigerator becomes lower than the temperature (OFF temperature) that turns off contact 35, toggle spring 34 is pulled by receptive spring 33a and returns to a stable position. As a result, movable spring 33b restores to a stable position by its own energizing force, then contact 35 leaves fixed contact 36, so that the cooling operation halts.

If rotation of cam 26 rotates adjusting plate 39 toward bellows 30, then screw head 40a of adjusting screw 40 is pulled by adjusting plate 39, thereby pulling coil spring 41. This mechanism increases the force of pulling lever 31 toward bellows 30. Thus the force for bellows 30 to push lever 31 to work on switch spring 33 should be also increased. Increasing the force of bellows 30 needs to increase the ambient temperature of detecting tube 29. It naturally allows increasing a set temperature.

If rotation of cam 26 rotates adjusting plate 39 in an opposite direction to bellows 30, screw head 40a together with adjusting plate 39 moves toward lever 31, thereby shrinking coil spring 41. This mechanism weakens the force of pulling lever 31 toward bellows 30, so that the force with which bellows 30 pushes lever 31 to work on switch spring 33 weakens. In this case, even if the ambient temperature of detecting tube 29 is low, bellows 30 can push lever 31, so that the set temperature can be inevitably lowered.

When the set temperature needs fine adjustment, a user can insert an accurate driver through observation hole 27a and rotate screw head 40a of adjusting screw 40, so that coil spring 41 can be extended or shrunk for finely adjusting the force to be applied to lever 31. As a result, the set temperature can be finely adjusted.

Figure 5:
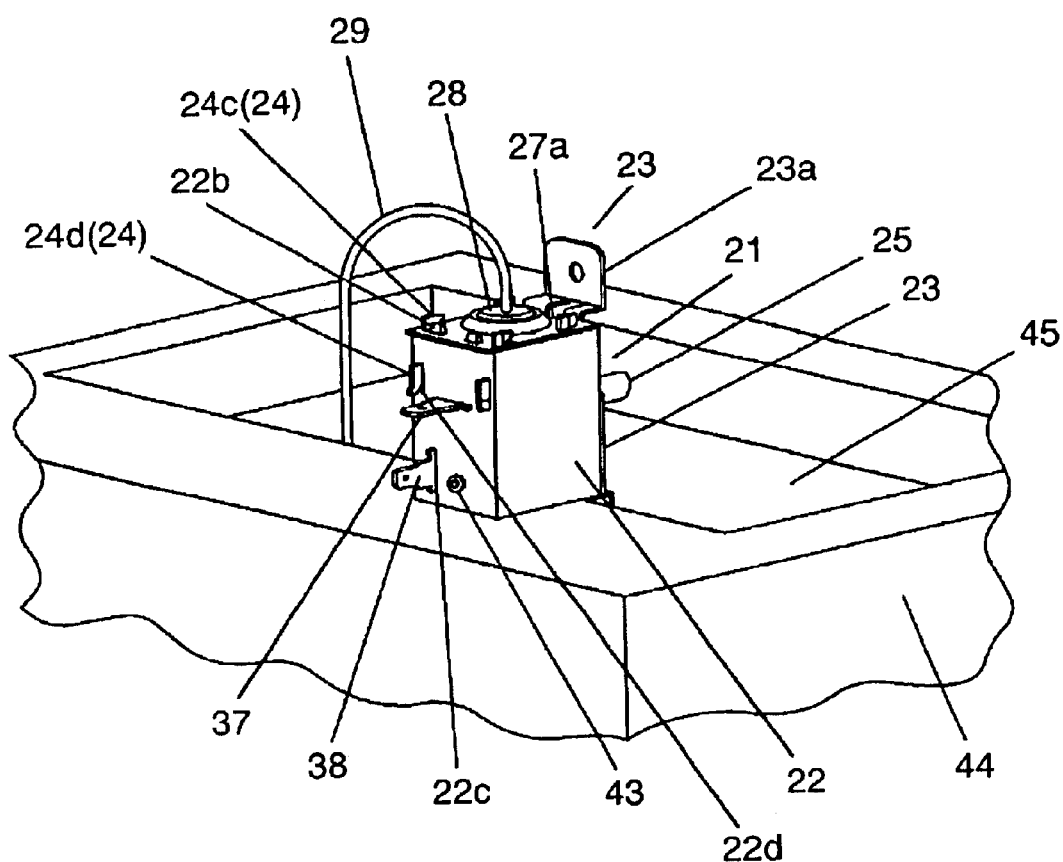
FIG. 5 shows a perspective view illustrating a posture of the thermostat shown in FIG. 1 at adjusting a set temperature.
Figure 6:
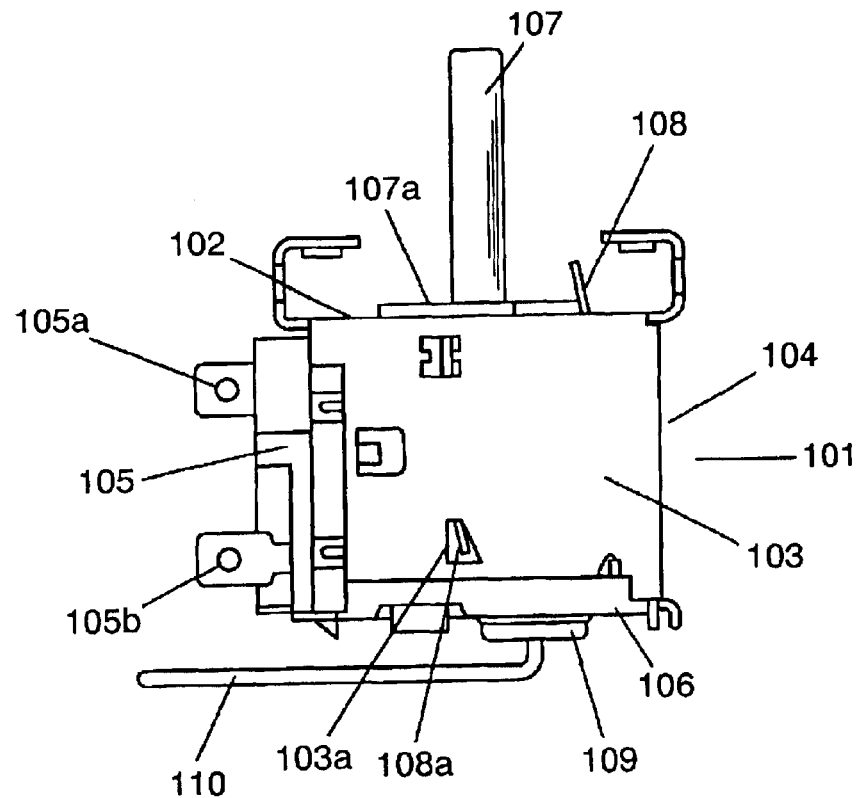
FIG. 6 shows a front view of a conventional thermostat.
Figure 7:
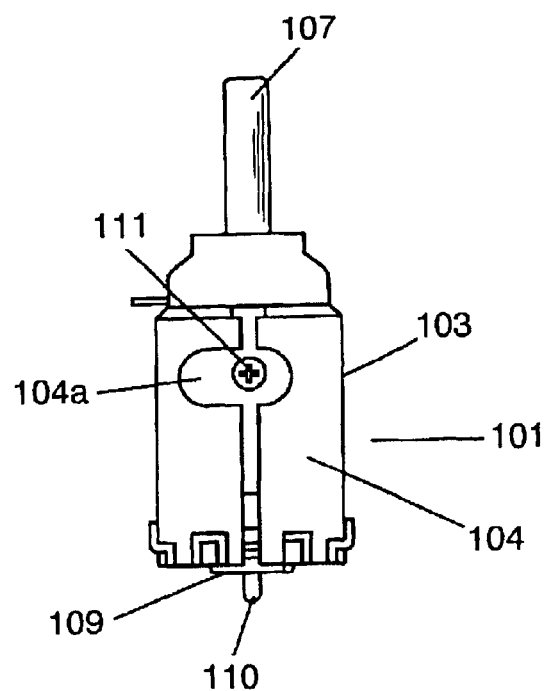
FIG. 7 shows a side view of the conventional thermostat shown in FIG. 6.

FIG. 5 shows a perspective view illustrating a posture of the thermostat to be adjusted its set temperature. In FIG. 5, liquid bath 44 sets a temperature of liquid 45 at a given temperature. Alcohol is used, in general, as liquid 45, and detecting tube 29 is dipped into liquid 45.

In this embodiment, the set temperature can be adjusted through observation hole 27a prepared on a face, where temperature sensing section 28 is provided, of housing 21. After the assembly of the thermostat, the set temperature is adjusted with the face, on which section 28 is provided, kept facing upward. At this time, wall plate 22 opposite to temperature sensing section 28 is placed at bottom, so that a flat bottom is obtained. As a result, positioning as well as adjustment can be done advantageously with ease because of the stable posture. A stable posture can be obtained by placing the temperature sensing section in an upper section of the thermostat, and this structure allows a user to operate the adjusting screw from the temperature sensing section, so that a simple operation can be expected.

As discussed above, the thermostat in accordance with this exemplary embodiment can keep a set temperature stable even if housing 21 is grasped by a user, touched with or hit against some foreign matter. Because respective fulcrums are free from being touched, which otherwise causes the positioning to be out of adjustment, and the set temperature can be thus kept stable.

Further, wall plate 22 protects supporting wall 24, so that the number of components does not increase, which can lower the cost.

Wall plate 22 unitarily molded of thermoplastic resin covers most of the housing, so that the appearance looks simple, and easiness of handling as well as mounting the thermostat to an apparatus can be improved.

A cleanly styled body is attractive as a component, so that it can be a factor for sales promotion.

In this embodiment, housing 21 is generally formed of a hexahedron, and four faces out of six faces are formed of wall plate 22 unitarily molded of thermoplastic resin. Thus the total area of through-holes, which are completely open to outside, is reduced, so that foreign matters such as dust are restrained from entering. Foreign matters are also restrained from attaching between contact 35 and fixed contact 36, so that the reliability of the switch mechanism can be improved.

Refrigerators that employ a flammable coolant having a low global warming factor such as isobutane have been recently accepted in the market because they contribute to prevention against the global warming. In those refrigerators, it is necessary to prevent the contact of the thermostat from being a firing source even if the flammable coolant leaked out. The thermostat of the present invention is mounted to such a refrigerator, and if the flammable coolant leaked out in the storage room and fired in the thermostat, since the total area of the through holes is reduced, the flame cannot reach the outside through the small holes. This structure thus can prevent an explosion.

Supporting wall 24 includes protruding face 24e that rises from other areas, and face 24e solidly contacts with protective face 22a of wall plate 22. The presence of protruding face 24e produces a space of at least a height of face 24e between fulcrum receptors 24a, 24b and protective face 22a. This space can avoid the interference between protective face 22a and first fulcrum 31a, second fulcrum 39b.

A protruding heights of first fulcrum 31a and second fulcrum 39b from supporting wall 24 are designed to be lower than the rising height of protruding face 24e. Thus first fulcrum 31a and second fulcrum 39b never touch protective face 22a. There exists no bad influence that fluctuates the set temperature. This structure produces no dust including cut-waste, so that the contact surface is not dusted, and the reliability of the switch mechanism can be improved.

The presence of rising and protruding face 24e reinforces supporting wall 24 and increases yield strength against unexpected external force. Solid contact with the protruding face reinforces the housing from the inside, and the supporting wall per se becomes stronger than a planar structure, so that the yield strength against external force can be increased.

The first and the second fulcrums are protected by the wall plate made of thermoplastic resin, and they are not exposed outside. This structure allows assembling the housing simply and with ease.

The total area of through-holes, which are completely open to outside, is reduced, so that foreign matters such as dust are restrained from entering. Foreign matters are also restrained from attaching between contact 35 and fixed contact 36, so that the reliability of the switch mechanism can be improved.

What is claimed is:

1. A thermostat comprising:
   (a) a housing;
   (b) a contact;
   (c) a switch mechanism accommodated in the housing;
   (d) a temperature sensing section for converting a volume change of gas, which is expanded or compressed in response to an ambient temperature, into force that operates the switch mechanism;
   (e) a lever receiving the force from the temperature sensing section for rotating on a first fulcrum to turn on or off the contact;
   (f) an adjusting plate engaging with the lever for rotating on a second fulcrum to increase or decrease the force necessary for rotating the lever; and
   (g) a cam shaft including a cam that rotates the adjusting plate,
   wherein the housing is placed outside a supporting wall that supports the first and the second fulcrums, and includes a wall that covers the first and the second fulcrums.

2. The thermostat of claim 1, wherein the housing includes:
   a wall plate, unitarily molded of thermoplastic resin, having the wall that covers the first and the second fulcrums;
   a first metal plate for holding the temperature sensing section; and
   a second metal plate for holding the cam shaft.

3. The thermostat of claim 2, wherein the housing is generally a hexahedron, and at least four faces out of six faces are formed of the wall plate, and one face other than the four faces is formed of the first metal plate, and another one face is formed of the second metal plate,
   wherein the second metal plate includes the supporting wall extending along an inner face of the wall plate.

4. The thermostat of claim 3, wherein the supporting wall includes a protruding and rising face that contacts with the inner face of the wall plate, and the supporting wall supports the first and the second fulcrums at an area other than the protruding and rising face.

5. The thermostat of claim 4, wherein a protruding height of the first and the second fulcrums from the supporting wall is lower than a rising height of the protruding and rising face.

6. The thermostat of claim 3 further comprising:
   a terminal coupled to the switch mechanism and extending through a wall plate, not facing the temperature sensing section, from an inside of the housing to an outside; and
   an adjusting screw for finely adjusting force necessary to operate the switch mechanism;
   wherein the adjusting screw is disposed in the housing and placed at a position where the screw is adjustable from the metal plate holding temperature sensing section.

* * * * *

UNITED STATES PATENT AND TRADEMARK OFFICE
CERTIFICATE OF CORRECTION

PATENT NO. : 6,819,216 B2  
DATED : November 16, 2004  
INVENTOR(S) : Ichiro Onishi et al.

It is certified that error appears in the above-identified patent and that said Letters Patent is hereby corrected as shown below:

Title page,
Item [73], Assignee, delete "Matsushita Electric Industrial Co., Ltd., Osaka" and insert -- Matsushita Refrigeration Company, Shiga --.

Signed and Sealed this

Fifth Day of April, 2005

JON W. DUDAS  
*Director of the United States Patent and Trademark Office*